United States Patent
Bhattacharjee et al.

(10) Patent No.: US 10,530,755 B2
(45) Date of Patent: Jan. 7, 2020

(54) SYSTEMS AND METHODS FOR PROVIDING ACCESS THROUGH USE OF SECURITY KEY PAIRS

(71) Applicant: MASTERCARD INTERNATIONAL INCORPORATED, Purchase, NY (US)

(72) Inventors: Manash Bhattacharjee, Jersey City, NJ (US); Stephane Wyper, Weehawken, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 308 days.

(21) Appl. No.: 15/682,933

(22) Filed: Aug. 22, 2017

(65) Prior Publication Data
US 2019/0068565 A1    Feb. 28, 2019

(51) Int. Cl.
| | |
|---|---|
| H04L 29/06 | (2006.01) |
| H04W 12/04 | (2009.01) |
| G06Q 30/06 | (2012.01) |
| G06Q 10/06 | (2012.01) |
| H04L 9/08 | (2006.01) |
| H04L 9/32 | (2006.01) |

(52) U.S. Cl.
CPC ........... *H04L 63/061* (2013.01); *G06Q 10/06* (2013.01); *G06Q 30/0645* (2013.01); *H04L 9/083* (2013.01); *H04L 9/0877* (2013.01); *H04L 9/3234* (2013.01); *H04L 63/10* (2013.01); *H04W 12/04* (2013.01); *H04L 2209/56* (2013.01); *H04L 2209/80* (2013.01); *H04L 2209/805* (2013.01)

(58) Field of Classification Search
CPC ....... H04L 63/10; H04L 63/061; H04L 9/083; H04L 9/0877; H04L 9/3234; H04W 12/04
See application file for complete search history.

(56) References Cited

U.S. PATENT DOCUMENTS

| | | | | |
|---|---|---|---|---|
| 5,461,217 A | * | 10/1995 | Claus | G06Q 20/105 235/375 |
| 5,974,368 A | * | 10/1999 | Schepps | G07C 5/008 340/10.2 |
| 2012/0099727 A1 | * | 4/2012 | Marshall | H04L 9/0825 380/255 |

(Continued)

*Primary Examiner* — Robert B Leung
*Assistant Examiner* — Carlos M De Jesus Lassala
(74) *Attorney, Agent, or Firm* — Harness, Dickey & Pierce, P.L.C.

(57) ABSTRACT

Exemplary systems and methods are disclosed for providing access through security key pairs. One exemplary method includes generating, by a platform, a key pair specific to a user and associated with an access period to an asset, where the key pair includes a first key and a second key associated with the first key, and storing the key pair in a data structure. The method also includes distributing the first key to an application associated with the user and distributing the second key to an access system of the asset. The method further includes receiving an access request for the asset during the access period and including the first key, identifying from the data structure the second key of the key pair based on the received first key, and transmitting a message including the second key to the access system for allowing, or not, access to the asset.

20 Claims, 3 Drawing Sheets

(56) References Cited

U.S. PATENT DOCUMENTS

| | | | |
|---|---|---|---|
| 2012/0129493 A1* | 5/2012 | Vasudevan | B60R 25/24 |
| | | | 455/411 |
| 2013/0173477 A1* | 7/2013 | Cairns | G06Q 20/3226 |
| | | | 705/76 |
| 2015/0326692 A1* | 11/2015 | Kaneko | G06F 21/41 |
| | | | 713/171 |
| 2016/0140787 A1* | 5/2016 | Hsueh | G07C 9/00563 |
| | | | 340/5.61 |
| 2017/0076405 A1* | 3/2017 | Shah | G06Q 50/01 |
| 2017/0161978 A1* | 6/2017 | Wishne | G07C 9/00309 |
| 2018/0117446 A1* | 5/2018 | Tran | A61B 5/0022 |
| 2019/0043294 A1* | 2/2019 | Runyon | G06F 21/32 |

\* cited by examiner

SYSTEMS AND METHODS FOR PROVIDING ACCESS THROUGH USE OF SECURITY KEY PAIRS

FIELD

The present disclosure generally relates to systems and methods for providing access through use of security key pairs, and in particular, for providing access to assets based on matched keys received through different channels, where the keys form security key pairs

BACKGROUND

This section provides background information related to the present disclosure which is not necessarily prior art.

People are known to rent homes, condos, apartments, and/or other structures (broadly, premises) from proprietors (e.g., owners, operators, etc.) associated therewith. As part of the rental process, the proprietors often provide physical keys or cards to the renting people, during rental periods, thereby permitting the renting people to gain access to the premises. When the rental periods are over, the renting people return the physical keys or cards to the proprietors, or leave the physical keys or cards at the premises for the proprietors to collect, so that they can be provided to subsequent renting people. In addition, apart from the physical keys and cards, the proprietors may provide access codes to the renting people for the premises, which may be entered at keypads associated with the premises, thereby permitting the renting people to access the premises.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When premises or other assets are rented or otherwise lent or given to users, access to the assets may be provided through physical keys/cards associated with the assets, or through access codes associated with the assets. With physical keys/cards, proprietors of the assets are required to physically deliver the keys/cards to the users (e.g., at the locations of the assets or elsewhere), which, as can be appreciated, may potentially create security issues if/when the users copy or replicate the keys/cards for use of the assets without permission of the proprietors, for example. Conversely, with access codes, such codes may be delivered verbally or electronically to the users, and may further be changed from time to time (e.g., after period of use by the users, etc.) to provide for security.

Uniquely, the systems and methods herein provide for use of a wallet platform, associated with virtual wallet applications (or e-wallets), to provide access to assets through key pairs. In particular, when a user rents or otherwise requests or purchases access to an asset (e.g., a premises, etc.), the wallet platform is employed to issue a key pair (e.g., a public-private key pair, etc.) and distribute one key from the key pair to the renting user and the other key to an access system associated with the asset. Then, when the user attempts to access the asset, the public key is provided (from a wallet application associated with the user) to the access system, which in turn provides the public key to the wallet platform. In turn, the wallet platform identifies the matching private key of the corresponding key pair and provides it back to the access system. If the private key received from the wallet platform matches the private key previously distributed to the access system, by the wallet platform, the user is provided access to the asset. In this manner, a secure mechanism for providing access to the asset is provided, and which may be conveniently maintained, changed and/or deleted as desired to permit access during a desired period but to deny access prior to or after such period. What's more, the public key of the distributed key pair is generally unknown to the user, but, even if known, it is generally only valid for the desired period (as it must match the corresponding private key), whereby keeping the key or providing it to others would pose a limited risk for the asset and/or the proprietor.

Figure 1:
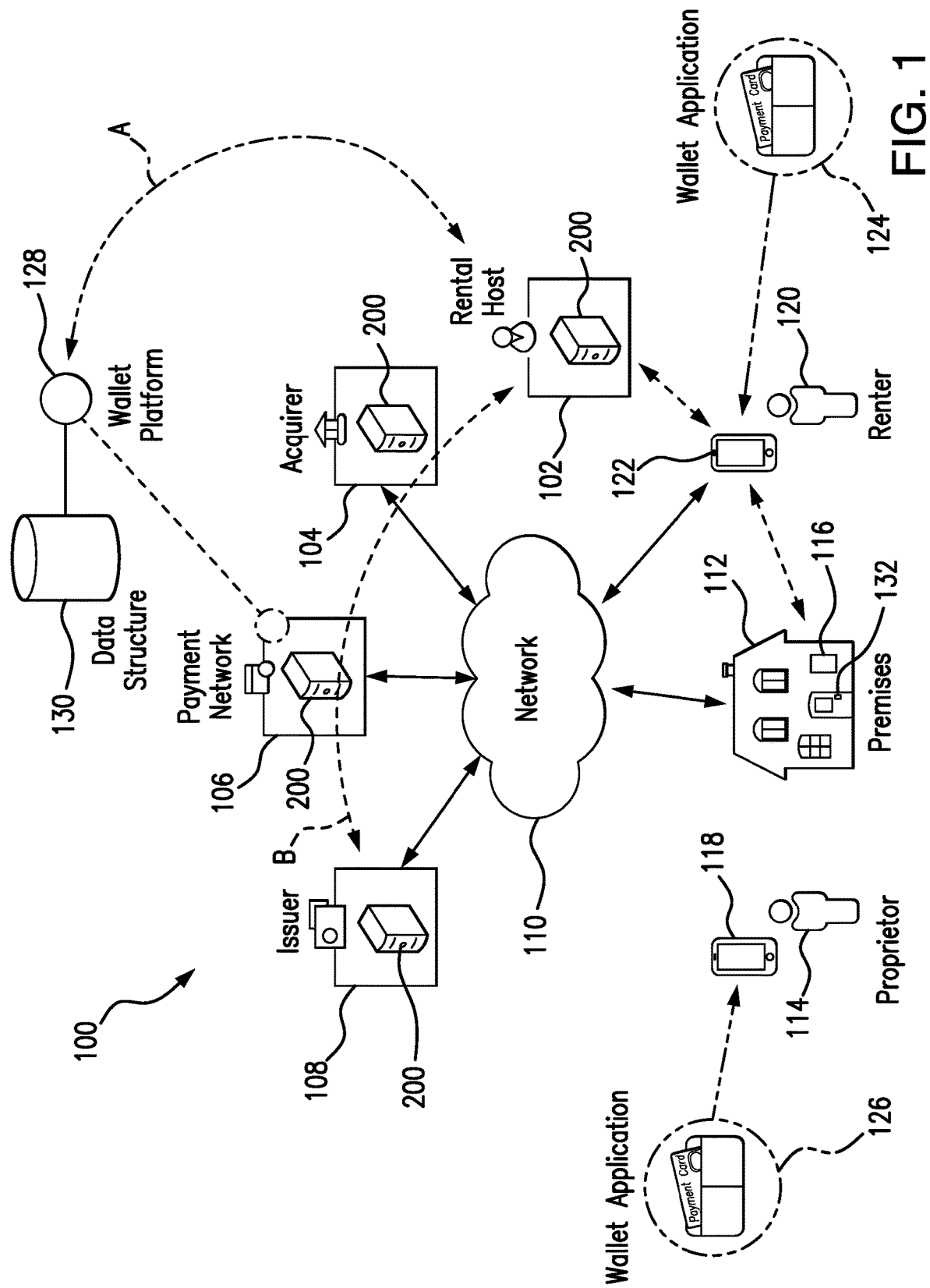
FIG. 1 is a block diagram of an exemplary system of the present disclosure suitable for use in providing access to assets through use of security key pairs.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, interactions between wallet platforms and access systems of premises, generation and provisioning of keys to renters and access systems (and/or others), etc.

The system 100 generally includes a rental host 102 associated with certain assets (e.g., premises, etc.), an acquirer 104 associated with the rental host 102, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the rental host 102, the payment network 106, and communication devices included in the system 100 (as described below).

In this exemplary embodiment, the system 100 also includes a premises 112 (broadly, an asset), which, as shown, includes a residential house. It should be appreciated, however, that the premises 112 may alternatively include an apartment, a condo, an office, a room, a building in general, a structure in general, etc. In addition (or alternatively), it should be appreciated that other assets (other than premises) may be included in the system 100 in other embodiments, for example, vehicles (e.g., cars, boats, trucks, etc.), etc.

That said, it should be appreciated that the description herein with regard to the premises 112 also generally applies to such other assets.

The illustrated premises 112 is associated with a proprietor 114 and includes an access system 116. In addition, the proprietor 114 is associated with a communication device 118, and may include an owner, operator or other person associated with the premises 112. And, the access system 116 may include, for example, an access panel at a door, a security system, etc., whereby one or more access points (e.g., doors, rooms, windows, door locks (e.g., door lock 132, etc.), etc.) and/or other features of the premises 112 (e.g., home automation controllers, etc.), are controlled by the access system 116 to permit or prevent the entry and/or exit of users to/from the premises 112.

In general herein, the premises 112 is provided by the proprietor 114 for rent to persons such as, for example, renter 120. In connection therewith, the premises 112 is listed and/or advertised by the rental host 102 at one or more network-based applications (e.g., websites, mobile application, etc.). The rental host 102 may then be accessed, for example, via the network-based application(s), by the renter 120 or others in order to view the premises 112 (e.g., pictures, descriptions, and/or specifications of the premises 112, etc.) and to initiate a transaction for rental of the premises 112 as desired. Examples of such rental host 102 may include, without limitation, Airbnb™ and/or its website, HomeAway™ and/or its website, and VRBO™ and/or its website, etc.

The renter 120 is associated with a communication device 122 and a payment account issued to the renter 120 by the issuer 108. What's more, the communication device 122 includes a virtual wallet application 124, which is provisioned with one or more credentials associated with the payment account issued by the issuer 108. In this manner, the communication device 122 may be configured, via the virtual wallet application 124, for use as a payment device to fund transactions. Likewise, the communication device 118 associated with the proprietor 114 includes a similar virtual wallet application 126, which is also provisioned with one or more credentials associated with a payment account issued to the proprietor 114 by the issuer 108 (or other issuer in the system 100). And again, in this manner, the communication device 118 may be configured, via the virtual wallet application 126, for use as a payment device to fund transactions.

The virtual wallet applications 124 and 126 at the communication devices 122 and 118 in the system 100 are associated with a wallet platform 128, which is configured to perform (alone or in combination with the wallet applications 124 and 126) certain operations as described herein. For example, the wallet platform 128 may be configured to compile and store a profile for each of the renter 120 and the proprietor 114 (e.g., upon registration with the corresponding virtual wallet applications 124 and 126, etc.) including, for example, account numbers, names, contact information, preferences, etc., and further may be configured to provide payment tokens in connection with transactions involving the wallet applications 124 and 126, etc. Each of the wallet applications 124 and 126, in turn, is configured to coordinate interactions (e.g., with the renter 120, the proprietor 114, etc.) at the respective communication devices 122 and 118 (e.g., initiate transactions, provide authentication, etc.). In one example, the wallet platform 128 includes the MasterPass™ wallet platform, which is associated and/or integrated with the payment network 106 (as indicated by the dotted line in FIG. 1). That said, however, other wallet platforms may be employed in other embodiments, either alone or integrated with the payment network 106 or elsewhere in the system 100 (e.g., with the issuer 108, etc.).

With that said, in an exemplary rental transaction by the renter 120 for the premises 112, the renter 120 initially interacts with the rental host 102 to view its listing of premises, including the premises 112. The renter 120 then selects the premises 112, enters the dates of rental and other pertinent information, as needed or desired, and then herein selects to fund the transaction with the wallet application 124. In response, the rental host 102 is configured to interact with the wallet platform 128 (along path A in FIG. 1), which, in turn, is configured to interact with the renter's wallet application 124 to authenticate the renter 120. And, when the renter 120 is authenticated, the wallet platform 128 is configured to provide a payment token to the rental host 102 (again, along path A).

Thereafter, the rental host 102 is configured to initiate a transaction for the rental of the premises 112 (using the payment token). In particular, the rental host 102 is configured to compile an authorization request for the transaction (including the payment token received from the wallet platform 128 for the renter's payment account) and submit the authorization request to the acquirer 104 (as associated with the rental host 102). The authorization request is transmitted along path B in FIG. 1. The acquirer 104, in turn, communicates the authorization request with the issuer 108 (associated with the renter's payment account), through the payment network 106 (e.g., through MasterCard®, VISA®, Discover®, American Express®, etc.). The issuer 108 is configured to then determine whether the renter's payment account is in good standing and whether there is/are sufficient funds and/or credit to cover the transaction. If the issuer 108 approves the transaction, an authorization reply (indicating the approval of the transaction) is transmitted back from the issuer 108 to the rental host 102, along path B, thereby permitting the rental host 102 to complete the transaction. The transaction is later cleared and/or settled (via appropriate transaction messages, such as clearing messages and/or settlement messages) by and between the rental host 102, the acquirer 104, and the issuer 108 (by appropriate agreements). If the transaction is declined, however, the authorization reply (indicating a decline of the transaction) is provided back to the rental host 102, along path B, thereby permitting the rental host 102 to halt or terminate the transaction or request other forms of payment.

Transaction data is generated, collected, and stored as part of the above interactions among the rental host 102, the acquirer 104, the payment network 106, the issuer 108, and the wallet platform 128. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the acquirer 104 and/or the issuer 108 may store the transaction data, or part thereof, in a data structure, or transaction data may be transmitted between parts of system 100 as used or needed. As used herein, transaction data may include, for example (and without limitation), payment tokens, amounts of the transactions, rental host IDs (broadly, merchant IDs), merchant category codes (MCCs), dates/times of the transactions, etc. It should be appreciated that more or less information related to transactions, as part of either authorization or clearing and/or settling, may be included in transaction records and stored within the system 100, at the rental host 102, the acquirer 104, the payment network 106 and/or the issuer 108.

In various exemplary embodiments, renters and others (e.g., renter 120, proprietor 114, etc.) involved in the different transactions herein are prompted to agree to legal terms associated with their payment accounts, for example, during enrollment in their accounts, during installation of virtual wallet applications to their communication devices (e.g., virtual wallet applications 124, 126; etc.), etc. In so doing, the renters, proprietors, and others may voluntarily agree, for example, to allow merchants, issuers, payment networks, wallet providers, etc., to use data collected during enrollment and/or collected in connection with processing the transactions herein, subsequently for one or more of the different purposes described herein.

Figure 2:
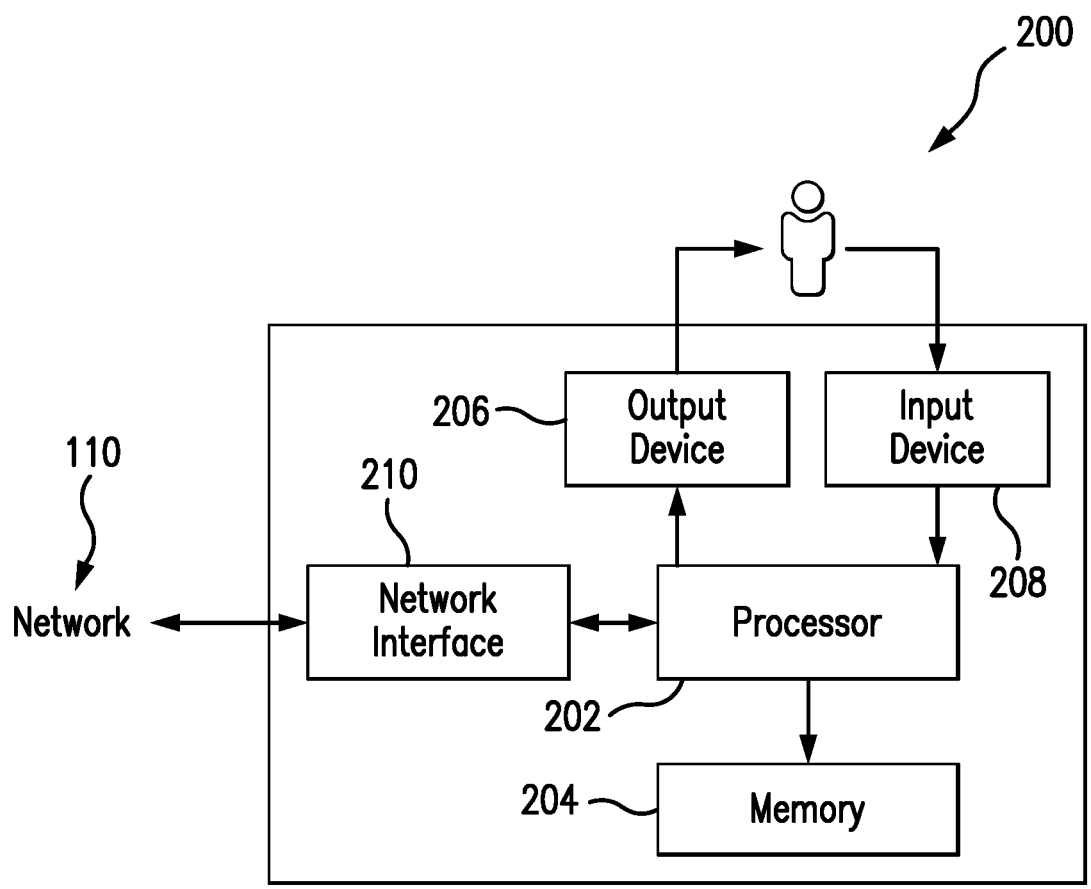
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, access systems, etc. In addition, the computing device 200 may include a single computing device, or it may include multiple computing devices located in close proximity or distributed over a geographic region, so long as the computing devices are specifically configured to function as described herein. In the system 100 illustrated in FIG. 1, each of the rental host 102, the acquirer 104, the payment network 106, and the issuer 108 are illustrated as including, or being implemented in, computing device 200, coupled to (and in communication with) the network 110. In addition, the communication devices 118 and 122 associated with the proprietor 114 and the renter 120, respectively, as well as the access system 116 may each be considered a computing device consistent with computing device 200. Further, the wallet platform 128 may be considered a computing device consistent with the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, rental records, assets IDs, payment tokens, access system profiles (e.g., system IDs, etc.), public keys, private keys, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in connection with one or more of the functions or processes described herein.

In the exemplary embodiment, the computing device 200 also includes an output device 206 that is coupled to (and is in communication with) the processor 202. The output device 206 outputs information and/or actions, for example, at the premises 112 (e.g., an action to open a door, etc.), to the renter 120 via his/her communication device 118 (e.g., information regarding rental of the premises 112, etc.), etc. It should be further appreciated that various interfaces (e.g., as defined by network-based applications, websites, etc.) may be displayed at the computing device 200, and in particular at the output device 206, to display certain information to the user. With that said, the output device 206 may include, without limitation, a liquid crystal display (LCD), a light-emitting diode (LED) display, an organic LED (OLED) display, an "electronic ink" display, printing devices, speakers, door latches/locks, home automation controllers, window latches/locks, room latches/locks, etc. In some embodiments, the output device 206 includes multiple devices.

In addition, the computing device 200 includes an input device 208 that receives inputs from the user of the computing device 200 (i.e., user inputs) such as, for example, premises information, access system credentials, etc. The input device 208 may include a single input device or multiple input devices. The input device 208 is coupled to (and is in communication with) the processor 202 and may include, for example, one or more of a keyboard, a pointing device, a mouse, a stylus, a magnetic stripe reader, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both an output device and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., Bluetooth™ adapter, NFC™ adapter, etc.), a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, in addition to participating in the transaction by the renter 120 to fund the rental of the premises 112 via his/her virtual wallet application 124, the wallet platform 128 of the system 100 is also configured to provide access to the premises 112 through key pairs. In particular, as part of the rental of the premises 112, the renter 120 provides to the proprietor 114 (directly or through the rental host 102) contact information for the renter 120 and other persons desiring access to the premises 112 during the rental period. In turn, the proprietor 114 submits, via the communication device 118, as configured by the wallet application 126, an access instruction to the wallet platform 128 for the premises 112 and for each of the identified persons (including the renter 120) desiring the access for the premises 112. In connection therewith, the access instruction may include, for example, a system ID for the access system 116, a password for the access system 116, a rental period for the premises 112, and contact information for the renter 120 and the other persons desiring access to the premises 112, etc.

Upon receiving the access instruction from the proprietor 114, the wallet platform 128 is configured, for example, to initially confirm that the rental transaction for the premises was completed (e.g., identify post-back information from the rental host 102 and/or the proprietor 114 to confirm that authorization and clearing for the rental transaction went through/has been approved, etc.). In so doing, the virtual wallet application 126 (e.g., an identifier associated therewith, etc.) is mapped to the proprietor 114 at the wallet platform 128 (and used for provisioning access to the premises 112), and which in turn is mapped to the access system 116 installed at the premises 112. Once the rental transaction is confirmed, the wallet platform 128 is configured to generate a key pair for the renter 120 (e.g., a private-public key pair, etc.), and additional key pairs for each of the other persons included in the instruction. In this exemplary embodiment, the wallet platform 128 is configured to generate a private-public key pair for the renter 120 based on an elliptic curve digital signature algorithm. The wallet platform 128 is configured to then store the key pairs in a key data structure 130 (along with the system ID for the access system 116, the password for the access system 116, etc., as provided in the access instruction). As illustrated in FIG. 1, the key data structure 130 is associated with the wallet platform 128. And, as with the wallet platform 128, the key data structure 130 may be included in a computing device consistent with computing device 200, or may be included in a memory, consistent with, for example, memory 204 (either as part of the computing device associated with the wallet platform 128 (as indicated by the connecting line in FIG. 1), or separate therefrom).

Further in the system 100, the wallet platform 128 is configured to expose an application programming interface or API to the access system 116 at the premises 112. In particular, after the key pairs are stored in the data structure 130, the wallet platform 128 is configured to transmit the system ID for the access system 116, the password for the access system 116, and the private keys for each of the key pairs to the access system 116, via the API (e.g., for storing at the access system 116 in memory 204, etc.) (e.g., as a provisioning API, etc.). The wallet platform 128 is also configured to provision the public key to the wallet application 124 at the start of the rental period, or prior thereto.

Subsequently, when the renter 120 attempts access at the premises 112, for example, at a door of the premises 112, the renter 120 waves, taps, or otherwise brings his/her communication device 122 into close proximity to the access system 116 and/or the door lock 132. The access system 116 is configured, then, to identify the communication device 122 (and the corresponding the wallet application 124 installed therein) via wireless connection (e.g., via an NFC™ connection, a Bluetooth™ connection, etc.). In connection therewith, the communication device 122, as configured by the wallet application 124, provides the public key to the access system 116 (and, in particular, to the door lock 132). In turn, the access system 116 is configured to call an API (e.g., as an access API, etc.) associated with the wallet platform 128, and provide its system ID and the public key received from the renter 120 (and a nonce, as described below). The wallet platform 128 is configured to then use the public key to identify the private key in the data structure 130. Once identified, the wallet platform 128 is configured to transmit an access message (i.e., an access command) to the access system 116, and specifically, to the door lock 132, including the system ID for the access system 116, the password for the access system 116, the identified private key from the generated key pair, and the public key.

Upon receipt of the access message, the access system 116 is configured to compare the private key (included in the access message) to the private key in its memory (e.g., the memory 204, etc.) previously distributed thereto by the wallet platform 128, and actuate the door lock 132, for example, when the two keys match, but not when the keys do not match.

It should be appreciated that in addition to the access API above, the wallet platform 128 may expose additional APIs for one or more additional purposes. For example, the wallet platform 128 may expose a close API, which is similar to the access API, but instead of providing access to the premises 112, permits the renter 120 to lock or otherwise close the premises 112. Also, a verification API may be exposed by the wallet platform 128, whereby the renter 120 may verify with the wallet platform 128 (similar to the API call along Path A) that the public key will provide access to the premises 112 for the renter's given rental period (even when the renter 120 is away from the premises 112). Further, a delete API may be exposed by the wallet platform 128 whereby the proprietor 114, the access system 116, and/or the renter 120 may be able to delete key pairs or particular ones of the keys (the public keys or the private keys) as desired. In particular, for example, the delete API may be utilized to delete keys or key pairs from the access system 116 and/or the wallet application 124 and/or the data structure 130 consistent with a given rental period (e.g., the key pairs may be deleted at the end of the given rental period, etc.). In at least one embodiment, the keys and/or key pairs may be deleted automatically at the access system 116 and/or the wallet application 124 and/or the data structure 130 apart from any call to the wallet platform 128 (e.g., automatically at the end of a given rental period, etc.).

Figure 3:
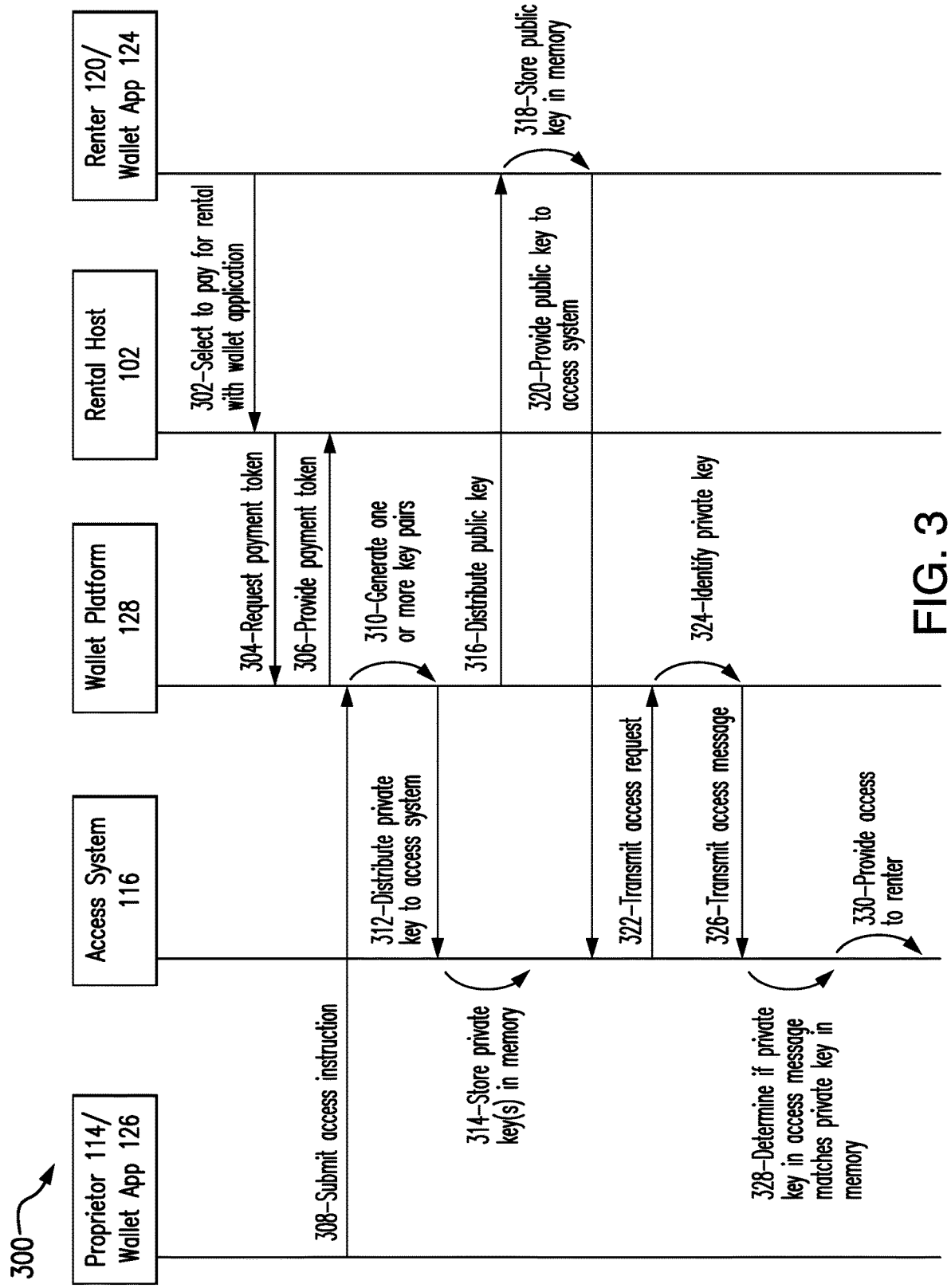
FIG. 3 is an exemplary method, suitable for use with the system of FIG. 1, for providing access to a premises through use of security key pairs distributed to an access system associated with the premises and a renter of the premises.

FIG. 3 illustrates an exemplary method 300 of providing access to one or more assets. The exemplary method 300 is described herein in connection with the wallet platform 128, the wallet applications 124 and 126, and the access system 116 of the premises 112 in the system 100. Further, for purposes of illustration, the exemplary method 300 is also described with reference to computing device 200. However, it should be appreciated that the method 300, or other methods described herein, are not limited to the system 100, or computing device 200. And, conversely, the systems and computing devices described herein are not limited to the exemplary method 300.

Initially in the method 300, the renter 120 interacts with the rental host 102 to identify the premises 112, and further decides to rent the premises 112. In doing so, the renter 120 provides details of the desired rental (e.g., rental duration or period, persons desiring access to the premises during the rental period, information relating to such persons (e.g., age, etc.), etc.), and selects to pay for the rental using his/her wallet application 124, at 302. Thereafter, the rental host 102 requests a payment token from the wallet platform 128, at 304, which, in turn, provides the payment token to the rental host 102, at 306, directly or potentially after the renter 120 is authenticated, via the wallet application 124, etc. The rental host 102 then submits an authorization request for the rental transaction (consistent with path B in FIG. 1 and the corresponding description in the system 100), whereby the transaction is approved and completed. The rental host 102 may then notify the proprietor 114 that the renter 120 has transacted to rent the premises 112, and provide the corresponding details of the rental (as submitted to the rental host 102 by the renter 120) to the proprietor 114 in connection therewith (such that the proprietor 114 is aware of the rental of the premises 112).

Next, the proprietor 114 submits, at 308, to the wallet platform 128, an access instruction for the renter 120, and specifically, for the rental of the premises 112 for the given rental period (or access period). The access instruction includes, without limitation, a system ID for the access system 116 at the premises 112 and a password for the access system 116, and also an identification of the desired rental period (as generally received from the rental host 102). The access instruction also includes a designator (or identifier) for one or more wallet applications of the renter 120 (i.e., a designator for the wallet application 124) and/or of the other persons associated with the renter 120 and desiring access to the premises 112 during the rental period (e.g., where the wallet applications may be ones coordinated with and/or available to the wallet platform 128, etc.). The designator for the renter's wallet application 124 may be obtained from the rental host 102 based on use of the wallet application 124 to rent the premises 112. Or, it may be directly provided by the renter 120.

As an example, the premises 112 may include a four bedroom house. In connection therewith, the renter 120 may provide access to the premises 112 to three other persons, whereby the renter 120 and the three other persons share the premises 112 during the rental period (as indicated to the rental host 102 by the renter 120 when renting the premises 112, or as indicated to the proprietor 114 by the renter 120 subsequent thereto). In such an example, a wallet designator for the renter's wallet application 124 as well as wallet designators associated with wallet applications of the additional persons desiring access to the premises 112 would be included in the access instruction from the proprietor 114 to the wallet platform 128. The wallet designator for the renter's wallet application 124, for example, may include an email address and/or phone number associated with the communication device 122 and/or the wallet application 124, or some other designator specific to the communication device 122 and/or the wallet application 124. And, the wallet applications associated with the other persons may then also include similar wallet designators. Moreover, the wallet designator(s) for the wallet applications may be provided by the renter 120 to the rental host 102 when renting the premises (such that the rental host 102 then provides it/them to the proprietor 114), or the proprietor 114 may subsequently receive the wallet designator(s) from the renter 120, etc. (such that the proprietor 114 is able to include them in the access instruction). Notwithstanding the above, the access instruction may include more or less information than described, as certain information (e.g., the wallet designator of the renter 120, the desired rental period for the premises 112, etc.) may alternatively be retrieved and/or captured, potentially, by the wallet platform 128 from the underlying payment account transaction for the rental of the premises 112 (and its associated transaction data).

In response to the access instruction, the wallet platform generates, at 310, one or more key pairs for the premises 112 and stores the generated key pair(s) in the data structure 130. Broadly, each of the key pairs includes a first key and a second key associated with the first key, such that the first key may be identified based on the second key, and vice-versa. More specifically, in this exemplary embodiment, each key pair includes a public key and a private key, generated based on the elliptic curve digital signature algorithm where each of the keys is a 256 bit integer key. An example private and public key pair is illustrated in Table 1. It should be appreciated, however, that public-private key pairs may be generated based on other algorithms and/or in other manners, with the corresponding keys having the same or different lengths and/or contents. In addition, as described above, the access instruction may pertain to multiple persons, for instance, the renter 120 and the three other persons sharing the premises 112 with the renter 120 in the above example. In such an example, the wallet platform 128 generates four separate key pairs, one for the renter 120 and one for each of the additional three persons sharing the premises 112 with the renter 120 during the desired rental period.

TABLE 1

| Private Key | 5HpHagT65TZzG1PH3CSu63k8DbpvD8s5ip4nEB3kEsreAnchuDf |
|---|---|
| Public Key | 5HpHagT65TZzG1PH3CSu63k8DbpvD8s5ip4nEB3kEsreAvUcVfH |

Once the key pair(s) is/are generated, the wallet platform 128 provisions, or broadly, distributes, the private key for each key pair to the access system 116, at 312. In general, the wallet platform 128 provides an API call to the access system 116, which includes, for example, the system ID for the access system 116, the password for the access system 116, and the private key(s) (e.g., an API integration such as Open Access(SystemID, Private Key, Password, Nonce); etc.), etc. In response, the access system 116 stores the received private keys(s) in memory associated therewith (e.g., the memory 204, etc.), at 314. What's more, in various embodiments, the wallet platform 128 may also provision, or broadly distribute, the private key(s) to the wallet application 126 associated with the proprietor 114 which in turn stores the provisioned private key in memory (e.g., the memory 204, etc.) in the communication device 118.

In addition, the wallet platform 128 also provisions, or broadly, distributes, the public key(s) for the key pair(s), at 316, to the corresponding ones of renter 120 and the other persons desiring access to the premises 112. This may be done prior to and/or at the beginning of the rental period for the premises 112. More particularly, the wallet platform 128 provisions the public key(s) to the appropriate virtual wallet applications of the renter 120 and the other persons (e.g., the public key for the key pair generated for the renter 120 is provisioned to the renter's wallet application 124, the public for the key pair generated for a first one of the persons is provisioned to the first one of the person's wallet application, etc.; etc.). In so doing, the wallet platform 128 identifies the wallet applications (e.g., the renter's wallet application 124, etc.) based on the wallet contact designators provided by the proprietor 114 in the access instruction and/or realized from the underlying transaction for rental of the premises 112 (at least for the renter's wallet application 124, for example, where the renter 120 utilizes his/her wallet application 124 to fund the transaction). In response, regarding the renter 120, for example, the renter's wallet application 124 stores the provisioned public key in memory (e.g., the memory 204, etc.) in the communication device 122, at 318. It should further be appreciated that when the wallet platform 128 distributes the other unique public keys to each of the other persons desiring access to the premises 112 during the rental period (apart from the renter 120), the public keys are similarly stored in communication devices and/or the wallet applications associated therewith.

With continued reference to FIG. 3, when the rental period begins for the premises 112, the renter 120 attempts to access the premises 112 via the door lock 132. In connection therewith, the access system 116 of the premises 112 detects the renter's communication device 122 (e.g., via Bluetooth™ communication when the communication device 122 is within a particular range of the premises 112, via NFC™ communication when the renter 120 taps the communication device 122 at the access system 116, etc.), whereupon the renter's wallet application 124 provides, at 320, the public key to the access system 116, via a Bluetooth™, NFC™, or other connection between the access system 116 and the communication device 122. In response, the access system 116 transmits an access request to the wallet platform 128, at 322, for example, via an API call thereto. The access request includes the public key received from the renter 120 and the system ID for the access system 116. In addition, the access request includes a nonce, which may include a unique identifier of the access request (as to other access requests), and a time and date of the access request.

The wallet platform 128, in turn, receives the access request and, based on the public key included therein, searches, in the key data structure 130, for the key pair associated therewith (e.g., the wallet platform 128 searches for the public key to thereby identify the corresponding private key of the given public-private key pair, etc.). Then, when the wallet platform 128 identifies the key pair for the public key, it similarly identifies the corresponding private key, at 324 (i.e., the corresponding private key in the key data structure 130 for the given key pair). Once identified, the wallet platform 128 transmits an access message back to the access system 116, at 326, for example, via another API call. The access message includes, for example, the system ID for the access system 116, the private key identified from the key data structure 130, the public key initially received from the access system 116 in the access request, and a nonce (e.g., including a time and date associated with the access message, etc.). And, upon receipt of the access message, the access system 116 determines, at 328, if the private key in the access message matches the private key stored in its memory (i.e., the private key previously provided to the access system 116 from the wallet platform 128 (at 312)).

When the access system 116 determines that the private key received from the wallet platform 128 in the access message matches the private key initially distributed to the access system 116 (when the key pair for the renter 120 was originally generated by the wallet platform 128), the access system 116 provides access to the renter 120, at 330. In particular, for example, the access system 116 may actuate the door lock 132 for the front door of the premises 112, or otherwise make the premises 112 accessible to the renter 120.

It should be appreciated that the above operations will generally be repeated for each access attempt by the renter 120 and/or the other authorized persons at the premises 112. In general, the wallet platform 128 will compile an access log for the premises 112, for each access request and/or access message provided above (e.g., based on the given public key, private key, time, device ID, and performed action for each access attempt, etc.). When the access requests and access messages include nonces, as provided above, the wallet platform 128 will be able to rely on the nonces to distinguish different access requests and access messages and further to provide time stamps in the access log for the comings and goings of the renter 120 and/or the other persons provided with access to the premises 112.

That said, the wallet platform 128 will continue to perform, as described above, during the rental period for the premises 112. After the rental period, however, the wallet platform 128 will remove the key pair for the renter 120 (and the other persons associated with the renter 120) from the key data structure 130, thereby severing the link between the public key and the private key at the premises 112. In this manner, the wallet platform 128 will be unable to identify the private key in the access system 116, which corresponds to a public key received from the access system 116 (as provided by the wallet application 124, for example). In connection therewith, the wallet platform 128 may transmit an instruction to the access system 116 and likewise remove the private key from its memory (e.g., the memory 204, etc.).

In view of the above, the systems and methods herein permit efficient grant of access to assets, including, specifically, premises, which are offered for rent by proprietors. By utilizing the wallet platform and the wallet applications at communication devices, access may be provided to the assets without the need for additional physical keys, or electronic cards, etc. Rather, the systems and methods herein rely on repurposing the communication devices and the wallet platform/applications to interact with the access systems (e.g., security systems at premises, etc.) to provide access. In this manner, the systems and methods herein deviate from the conventional to provide improved flexibility and/or more efficient and secure interactions between renters and proprietors in connection with access to the assets.

It should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) generating, by a wallet platform, a key pair specific to a user and associated with an access period to an asset by the user, the key pair including a first key and a second key associated with the first key; (b) storing the key pair in a data structure; (c) distributing, by the wallet platform, the first key to a virtual wallet application associated with the user; (d) distributing, by the wallet platform, the second key to an access system of the asset; (e) receiving, at the wallet platform, an access request for the asset during the access period, the access request including the first key; (f) in response to the access request, identifying, by the wallet platform, from the data structure, the second key of the key pair based on the first key; and (g) transmitting a message including the second key to the access system, whereby the access system is able to permit access to the asset when the second key included in the message matches the second key distributed to the access system by the wallet platform.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in providing access to one or more assets, the system comprising:
a wallet platform computing device including executable instructions, which when executed by the wallet platform computing device, cause the wallet platform computing device to:
receive an access instruction regarding access of a user to an asset for an access period;
generate at least one key pair and store the at least one key pair in memory associated with the wallet platform computing device, the at least one key pair including a first key and a second key;
provision the first key to the user, at a wallet application associated with the user, prior to or at a beginning of the access period;
provision the second key to an access system associated with the asset;
receive an access request, from the access system, during the access period, the access request including the first key;
identify the second key included in the key pair, in the memory, based on the first key; and
transmit an access message to the access system, the access message including the second key identified in the memory, thereby permitting the access system to provide access to the asset, to the user, when the second key included in the access message matches the second key provisioned to the access system.

2. The system of claim 1, wherein the executable instructions, when executed by the wallet platform computing device, further cause the wallet platform computing device to provide a payment token to a rental host associated with the asset in connection with a payment account transaction by the user relating to the asset, after authenticating the user, via the wallet application.

3. The system of claim 1, wherein the executable instructions, when executed by the wallet platform computing device, further cause the wallet platform computing device to remove the key pair from the memory associated with the wallet platform after the access period.

4. The system of claim 1, wherein the first key is a public key and the second key is a private key; and
wherein the executable instructions, when executed by the wallet platform computing device, cause the wallet platform computing device to generate the key pair based on an elliptic curve digital signature algorithm.

5. The system of claim 1, wherein the asset includes a premises; and further comprising the access system associated with the premises, wherein the access system is configured to capture the first key, from a communication device associated with the user, and to transmit the access request to the access system via an application programming interface (API).

6. The system of claim 5, wherein the access system includes a door lock associated with a point of entry of the premises; and wherein the access system is further configured to:
receive the access message from the wallet platform;
compare the second key received in the access message to the second key provisioned to the access system by the wallet platform; and
actuate the door lock to thereby provide the access to the premises when the second key in the access message matches the second key provisioned to the access system.

7. The system of claim 1, wherein the executable instructions, when executed by the wallet platform computing device, further cause the wallet platform computing device to compile an access log for the asset at least based on the access request received from the access system.

8. A non-transitory computer readable storage media including executable instructions for providing access to a premises, which, when executed by at least one processor, cause the at least one processor to:

in response to an access instruction for a rental period, generate at least one key pair, the at least one key pair including a public key and a private key, the at least one key pair being specific to a user;
store the at least one key pair in memory associated with the at least one processor;
expose an application programming interface (API) to an access system associated with the premises and an API to a wallet application associated with the user;
provision the public key to the user at the wallet application associated with the user, via the API exposed to the wallet application;
provision the private key to the access system associated with the premises, via the API exposed to the access system;
receive an access request, via an API, from the access system during the rental period for the premises, the access request including the public key;
identify, in the memory, the private key for the at least one key pair based on the public key received from the access system; and
when the private key is identified in the memory, transmit an access message to the access system via an API, the access message including the identified private key, thereby permitting the access system to compare the identified private key included in the access message with the private key provisioned thereto and to provide access upon a match.

9. The non-transitory storage media of claim 8, wherein the computer executable instructions, when executed by the at least one processor, further cause the at least one processor to generate the at least one key pair based on an elliptic curve digital signature algorithm.

10. The non-transitory storage media of claim 9, wherein the private key of the at least one key pair includes a 256 bit integer, and wherein the public key of the at least one key pair includes a 256 bit integer.

11. A method for use in providing access to assets through security key pairs, the method comprising:

generating, by a wallet platform computing device, a key pair specific to a user and associated with an access period to an asset by the user, the key pair including a first key and a second key associated with the first key;
storing the key pair in a data structure;
distributing, by the wallet platform computing device, the first key to a virtual wallet application associated with the user;
distributing, by the wallet platform computing device, the second key to an access system of the asset;
receiving, at the wallet platform computing device, an access request for the asset during the access period, the access request including the first key;
in response to the access request, identifying, by the wallet platform computing device, from the data structure, the second key of the key pair based on the first key; and
transmitting a message including the second key to the access system, whereby the access system is able to permit access to the asset when the second key included in the message matches the second key distributed to the access system by the wallet platform.

12. The method of claim 11, wherein the asset includes a premises, and wherein the access period includes a rental period for the premises.

13. The method of claim 11, wherein the first key is a public key and the second key is a private key; and wherein distributing the second key includes distributing the private key to the access system via an application programming interface (API) call, the API call including a system ID for the access system and a password for the access system.

14. The method of claim 13, further comprising receiving, at the wallet platform computing device, an access instruction from a virtual wallet application associated with a proprietor of the asset, the access instruction including the system ID for the access system, the password for the access system, and a wallet contact designator associated with the virtual wallet application of the user;

wherein generating the key pair includes generating the key pair in response to receiving the access instruction; and
wherein distributing the first key to the virtual wallet application associated with the user includes distributing the public key to the virtual wallet application associated with the user based on the wallet contact designator.

15. The method of claim 13, further comprising:
removing the key pair from the data structure after the access period;
after removing the key pair from the data structure, receiving, at the wallet platform computing device, an access request from the access system including the first key;
searching in the data structure for the first key; and
transmitting a message to the access system, without a private key, when the public key is not identified in the data structure.

16. The method of claim 11, wherein generating the key pair includes generating multiple key pairs, each of the multiple key pairs associated with one of the user and multiple other users, each of the multiple key pairs including a first key and a second key associated with the first key; and wherein distributing, by the wallet platform computing device, the second key to the access system of the asset includes distributing the second key of each of the multiple key pairs to the access system of the asset.

17. The method of claim 11, further comprising transmitting a message to the access system, without a second key, when no corresponding second key for the first key is identified by the wallet platform in the data structure.

18. The method of claim 11, wherein the access request for the asset includes one or more of a time, a date, and a unique identifier associated with the access request, which distinguishes the access request from one or more other access requests; and further comprising storing the one or more of the time, the date, and the unique identifier associated with the access request for the asset in memory of the wallet platform computing device, thereby compiling an access log for the asset.

19. The method of claim 11, wherein receiving, at the wallet platform computing device, the access request during the access period includes receiving the access request for the asset via an application programming interface (API) call by the access system to the wallet platform.

20. The method of claim 11, wherein the wallet platform computing device includes the data structure.

* * * * *